(12) United States Patent
Hunter

(10) Patent No.: US 6,430,603 B2
(45) Date of Patent: *Aug. 6, 2002

(54) SYSTEM FOR DIRECT PLACEMENT OF COMMERCIAL ADVERTISING, PUBLIC SERVICE ANNOUNCEMENTS AND OTHER CONTENT ON ELECTRONIC BILLBOARD DISPLAYS

(75) Inventor: Charles Eric Hunter, Hilton Head Island, SC (US)

(73) Assignee: World Theatre, Inc., Morrisville, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,102

(22) Filed: Apr. 28, 1999

(51) Int. Cl.⁷ .............................................. G06F 15/16
(52) U.S. Cl. ...................... 709/207; 709/217; 709/219; 709/227; 705/26; 705/27
(58) Field of Search .............................. 709/207, 217, 709/218, 219, 227, 234, 238, 240; 705/26, 27

(56) References Cited

U.S. PATENT DOCUMENTS

| | | |
|---|---|---|
| 3,373,517 A | 3/1968 | Halperin |
| 3,376,465 A | 4/1968 | Corpew |
| 3,941,926 A | 3/1976 | Slobodzian et al. |
| 4,368,485 A | 1/1983 | Midland |
| 4,559,480 A | 12/1985 | Nobs |
| 4,734,779 A | 3/1988 | Levis et al. |
| 4,761,641 A | 8/1988 | Schreiber |
| 4,812,843 A | 3/1989 | Champion, III et al. |
| 5,214,793 A | 5/1993 | Conway et al. |
| 5,233,423 A | 8/1993 | Jernigan et al. |
| 5,257,017 A | 10/1993 | Jones et al. |
| 5,274,762 A | 12/1993 | Peterson et al. |
| 5,469,020 A | 11/1995 | Herrick |
| 5,486,819 A | 1/1996 | Horie |
| 5,543,856 A | 8/1996 | Rosser et al. |
| 5,612,741 A | 3/1997 | Loban et al. |
| 5,630,067 A | 5/1997 | Kindell et al. |
| 5,644,859 A | 7/1997 | Hsu |
| 5,724,062 A | 3/1998 | Hunter |
| 5,781,734 A | 7/1998 | Ohno et al. |
| 5,845,083 A | 12/1998 | Hamadani et al. |
| 5,848,129 A | 12/1998 | Baker |
| 5,898,384 A * | 4/1999 | Alt et al. ................ 340/825.36 |
| 5,934,795 A * | 8/1999 | Rykowski et al. ........... 362/309 |
| 5,992,888 A * | 11/1999 | North et al. ................... 283/56 |
| 6,073,372 A * | 6/2000 | Davis ....................... 40/124.16 |

OTHER PUBLICATIONS

Steven A. Morley, "Making Digital Cinema Actually Happen—What It Takes and Who's Going to Do It", *Qualcomm Incorporated*, Oct. 31, 1998.

* cited by examiner

Primary Examiner—Thomas R. Peeso
(74) Attorney, Agent, or Firm—Finnegan, Henderson, Farabow, Garrett & Dunner, LLP

(57) ABSTRACT

Commercial advertisers, such as consumer product companies and the advertising agents that represent them, directly access a network of thousands of large, high resolution electronic displays located in high traffic areas and directly send their own advertisements electronically to the network to be displayed at locations and times selected by the advertisers.

74 Claims, 2 Drawing Sheets

SYSTEM FOR DIRECT PLACEMENT OF COMMERCIAL ADVERTISING, PUBLIC SERVICE ANNOUNCEMENTS AND OTHER CONTENT ON ELECTRONIC BILLBOARD DISPLAYS

FIELD OF THE INVENTION

The invention relates to systems permitting advertisers to target geographical regions and demographic groups with ever changing, current advertising content without incurring the high fixed cost of traditional single-message billboards. More particularly, the invention relates to a system and method permitting commercial advertisers, such as consumer product companies and the advertising agents that represent them, to directly access a network of thousands of large, high resolution electronic displays located in high traffic areas and to directly send their own advertisements electronically to the network to be displayed at locations and times selected by the advertiser.

BACKGROUND OF THE INVENTION

Consumer product advertising takes many forms, such as television commercials, newspaper and magazine advertisements, mailings, point-of-sale displays, outdoor billboards, etc. Using current advertising media, advertisers engage in a constant struggle to efficiently use their budgets to most effectively reach their geographic and demographic targets.

Focusing on the outdoor advertising component of advertising by consumer product companies, it is well known that outdoor billboards have traditionally taken the form of single-message displays formed of printed sheets or painted surfaces containing the advertising content adhered to a flat backing. This time-honored outdoor advertising technique has remained essentially unchanged throughout the twentieth century. The high cost of printing, transporting and mounting a message on a conventional billboard has dictated that the same message remain in place for a considerable period of time. Thus, a conventional billboard cannot be readily changed to reflect current events within the geographic area of the billboard. Additionally, the content on a conventional billboard tends to become essentially "invisible" as a part of the landscape after its content has been in place for a relatively short period of time, especially to commuters and others who regularly pass the billboard. Beyond the above problems with cost, single-message content, lack of content changeover capability, and the like, conventional outdoor billboards have come under increasing criticism because in their large numbers, and often tattered condition, they clutter highways with a distasteful form of visual "pollution". A reduction in the number of billboards and improvement of the appearance of those that remain, if accomplished while increasing the overall advertising impact afforded by outdoor advertising, would please virtually everyone.

The use of electronic billboards has been suggested, for example, in U.S. Pat. No. 5,612,741. However, there is no electronic billboard network in operation whereby commercial advertisers may directly place ads onto selected billboards at selected times through direct access to a master network. Such a network, properly designed and operated, promises to overcome the numerous disadvantages currently associated with the outdoor advertising industry, while also meeting the above-enumerated needs of consumer products advertisers.

SUMMARY OF THE INVENTION

According to the present invention, commercial advertisers, such as consumer product companies and the advertising agents that represent them, directly access a network of multiple large, high resolution electronic displays located in high traffic areas and directly send their own advertisements electronically to the network to be displayed at locations and times selected by the advertisers. In preferred embodiments, the system of the invention includes a central information processing center that permits customers to review a schedule of times and electronic display locations that are available for placement of advertisements, and also permits customers to purchase available times at selected electronic display locations for placement of their advertising content. The customer then transmits his video or still image advertising content to the processing center where the content is reviewed for appropriateness and then transmitted to the customer-selected electronic display(s). The electronic displays preferably are large (e.g., 23×33½ ft.) flat LED displays that are driven by their own video or image servers. Verification that the advertisements run as ordered is facilitated by an information storage module or, more preferably, by a digital camera or series of digital cameras. A traffic counter may be used to determine the traffic that passed by the display while the advertisement was running. Bills and reports containing market and demographic analysis are generated and sent to the customer.

BRIEF DESCRIPTION OF THE DRAWINGS

Some of the features of the invention having been stated, other features will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
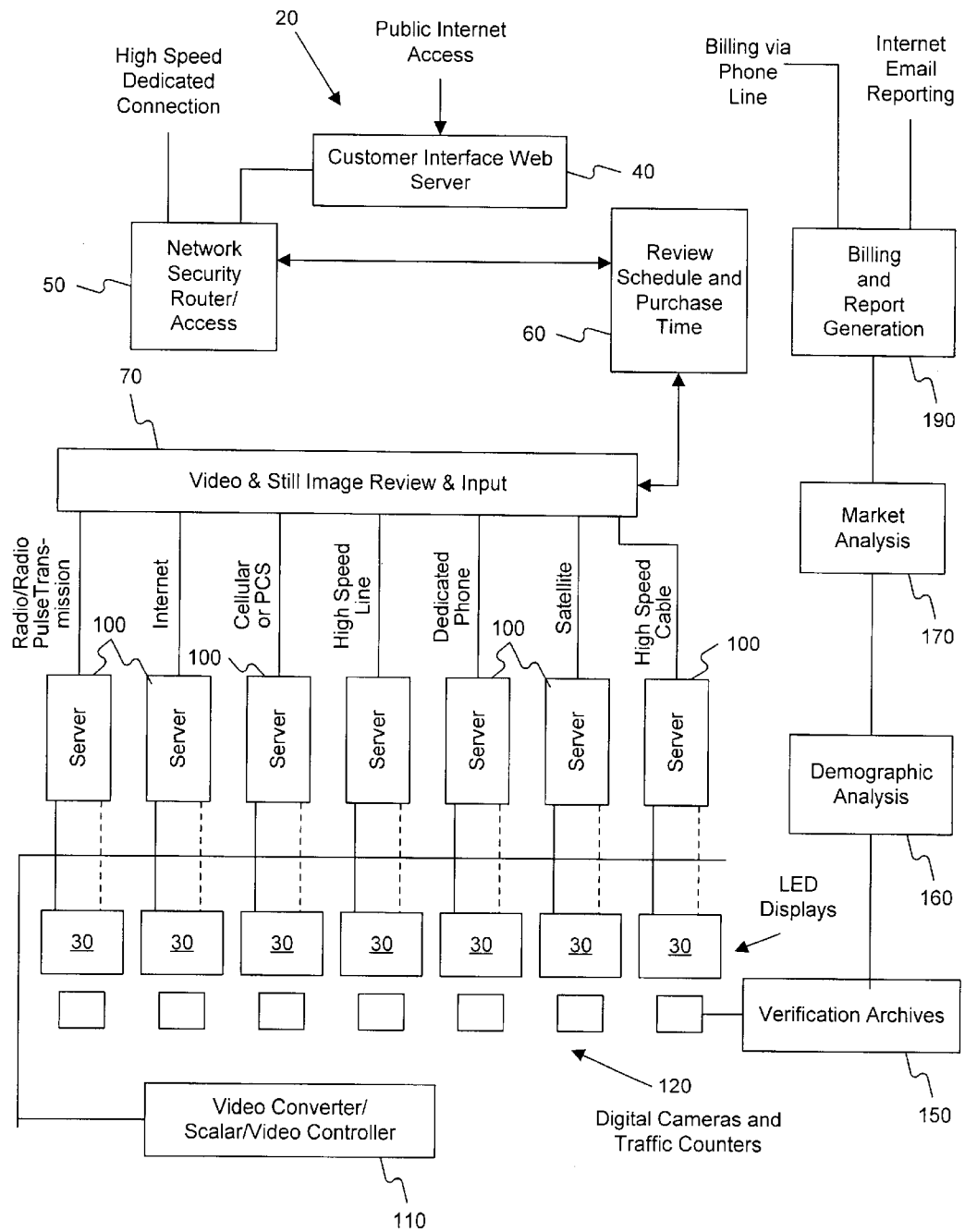
FIG. 1 is a block diagram showing the principal components of an electronic display network constructed in accordance with the present invention.

Referring to the drawings, and particularly to FIG. 1, there is shown a block diagram of a system 20 for direct placement of commercial advertisements, public service announcements and other content on electronic displays. System 20 includes a network comprising a plurality of electronic displays 30 that are located in high traffic areas in various geographic locations. The displays may be located in areas of high vehicular traffic, and also at indoor and outdoor locations of high pedestrian traffic, as well as in movie theaters, restaurants, sports arenas, casinos or other suitable locations. Thousands of displays, up to 10,000 or more displays worldwide, may be networked according to the present invention. In preferred embodiments, each display is a large (for example, 23 feet by 33½ feet), high resolution, full color display that provides brilliant light emission from a flat panel screen.

A customer of system 20, for example an in-house or agency representative of a consumer products company, may access a central information processing station of the system via the Internet through a Customer Interface Web Server 40. The customer interface web server has a commerce engine and permits the customer to obtain and enter security code and billing code information into a Network Security Router/Access module 50. Alternatively, high usage customers of the system may utilize a high speed dedicated connection to module 50. Following access, the customer reviews available advertising time/locations through a Review Schedule and Purchase Time module 60 that permits the customer to see what time is available on any display throughout the world and thereafter schedule and purchase the desired advertising time slot. Next, the customer transmits the advertising content on-line through the Internet, a direct phone line or a high speed connection (for example, ISDN or DSL) for receipt by the system's Video & Still Image Review and Input module 70. In parallel, the system operator may provide public service announcements and other content to module 70. All content, whether still image or video, is formatted in NTSC, PAL, SECAM, YUV, YC, VGA or other suitable formats.

The video & still image review and input module 70 permits a system security employee to conduct a content review to assure that all content meets the security and appropriateness standards established by the system, prior to the content being read to the server 100 associated with each display 30 where the content being transmitted to the server 100 will be displayed. Preferably, the servers are located at their respective displays and each has a backup. An example of a suitable server is the IBM RISC 6000 server.

The means for transmitting content information to the display locations may take a number of forms, with it being understood that any form, or combination thereof, may be utilized at various locations within the network. As shown in FIG. 1, the means include:

a. High speed cable b. Satellite c. Dedicated phone d. High speed line (e.g., ISDN)

e. Cellular or PCS f. Internet g. Radio/radio pulse transmission h. High speed optical fiber.

A video converter/scaler function and a video controller function provided by module 110 may be utilized in connection with those servers 100 and associated displays 30 that require them, according to data transmission practices well known in the art.

Verification that advertisements do, in fact, run at the intended time at the intended displays may be provided by an information storage module (not shown) linked to each display. Another form of verification may be achieved by a Digital Camera and Traffic Count Recorder 120 that continuously records the content appearing at its respective display 30 and digitally transmits video verification information to a Verification Archives module 150. Recorder 120 also provides traffic count information (for example, 225 vehicles passed the display while an advertisement ran) to verification archives module 150.

Information from verification archives module 150 is utilized by a demographic analysis module 160 and a market analysis module 170 to generate information for reports to be sent to customers after their advertisements run. To this end, analysis data from modules 160 and 170 is transmitted to a Billing and Report Generation module 190 where reports are assembled showing, for example, the time of the advertisement, the content of the advertisement, the traffic count and residence/median income information about those who saw the advertisement. A representative, simplified report for an advertisement running on a single display is as follows:

---

Customer: ABC Cola Co.
Ad Content: Ocean Scene with graphics (content code 1111)
Location: Atlanta, Georgia, Interstate 75 N, milepost 125 (site code XXXX)
Time: 7:30 AM, June 30, 2000
Vehicle Count: 225
Viewer Count: 340
Viewer Demographics:
- 50% Resident Cobb County, GA Median household income: $60,000/yr.
- 30% Resident DeKalb County, GA Median household income: $52,000/yr.
- 20% Median household income $55,000/yr.

Advertising Cost: $X

---

For an advertisement that may have run at multiple displays, for example 100 displays, a representative report may appear as follows:

---

Customer: ABC Cola Co.
Ad Content: Mountain Scene with graphics (content code 2222)
Locations: 100 sites (site codes YYY....ZZZ)
Time: 8:30 AM, July 10, 2000
Total Vehicle Count: 21,500
Total Viewer Count: 37,200
Viewer Demographics: Median household income, $49,500
Advertising Cost: $Y

---

Module 190 also produces bills that may be transmitted by phone lines for a debit payment such as a direct bank draft, or other suitable payment mode.

Figure 2:
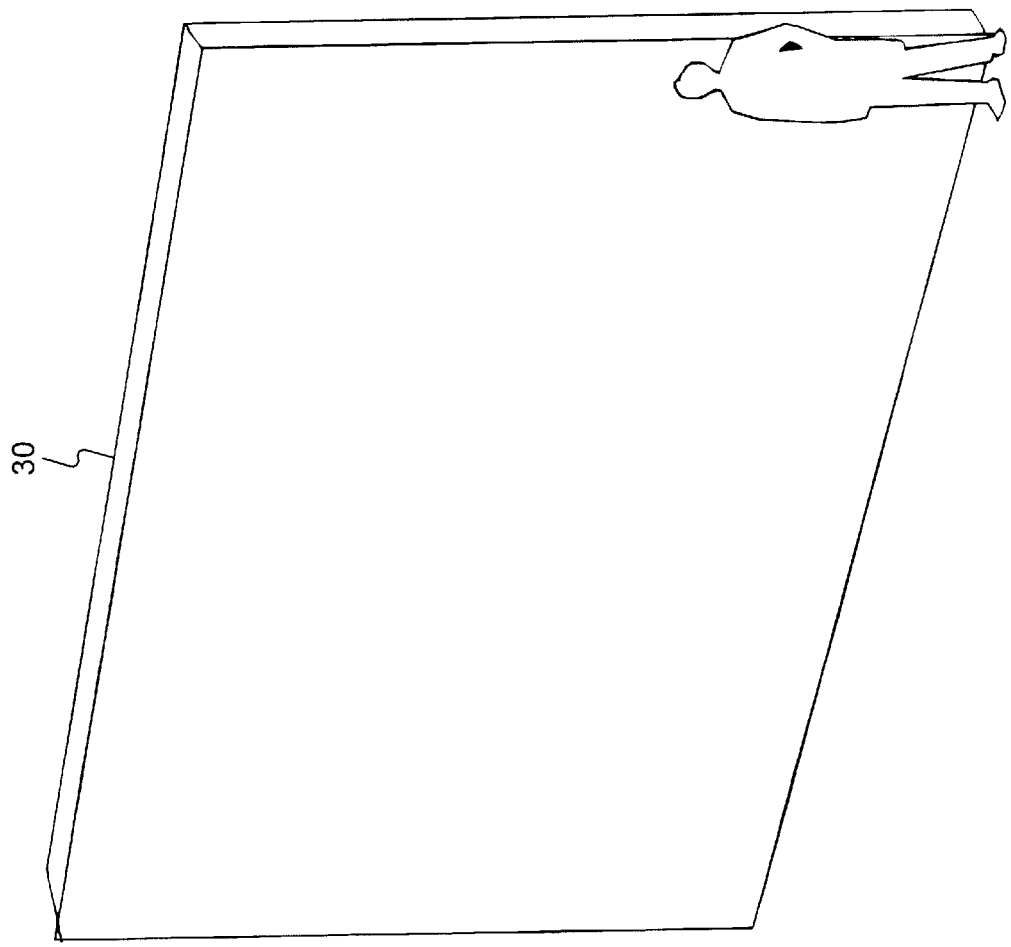
FIG. 2 is a view of one of the electronic displays of the network of FIG. 1.

Referring to FIG. 2, there is shown a pictorial view of one preferred form for the electronic displays 30. In this embodiment, display 30 takes the form of a 23 feet by 33½ feet seamless flat screen display including multiple flat panel display modules. The panels utilize advanced semiconductor technology to provide high resolution, full color images utilizing light emitting diodes (LED's) with very high optical power (1.5–10 milliwatts or greater) that are aligned in an integrated array with each pixel having a red, green and blue LED. It will be appreciated that multiple LED's of a given color may be used at pixels to produce the desired light output; for example, three 1.5 milliwatt blue LED's may be used to produce a 4.5 milliwatt blue light output. Each red, green and blue emitter is accessed with 24 bit resolution, providing 16.7 million colors for every pixel. An overall display of 23 feet by 33½ feet, so constructed, has a high spatial resolution defined by approximately 172,000 pixels at an optical power that is easily viewable in bright sunlight. Suitable display modules for displays 30 are manufactured by Lighthouse Technologies of Hong Kong, China, under Model No. LV50 that utilize, for blue and green, InGaN LED's fabricated on single crystalline $Al_2O_3$ (sapphire) substrates and, for red, superbright AlInGaP LED's fabricated on a suitable substrate such as GaP. These panels have a useful life in excess of 50,000 hours, for example, an expected life under the usage contemplated for network 20 of 150,000 to 200,000 hours and more. In preferred embodiments, the panels are cooled from the back of the displays, preferably via a refrigerant-based air conditioning system (not shown) such as a forced air system or a thermal convection or conduction system. Non refrigerant-based options may be used in locations where they produce satisfactory cooling. The displays preferably have a very wide viewing angle, for example, 160°.

While the Lighthouse Technologies displays utilize the InGaN on sapphire and AlInGaP on GaP LEDIs described above, other materials may be used for the LED's as follows:

1. (Blue/green) InGaN on SiC, preferably with a suitable buffer layer such as AlN
2. (Blue/green) InGaN on GaN
3. (Blue/green) InGaN on AlN, preferably with a suitable buffer layer such as AlN.

It will be appreciated that the InGaN on sapphire and the other solid state LED's described above have substrates with high optical transmissivity and produce very high optical power. This is important for a number of reasons, including giving the electronic display designers the ability to create very wide viewing angles up to approximately 160°, and the resultant increase in visibility of the displays to viewers in oncoming traffic.

In addition to the particular solid state LED's mentioned above, the discrete sources of blue, green and red light at each pixel may take other forms such as composite devices including an ultraviolet LED that is utilized to excite a phosphor that, in turn, produces light of a selected spectrum. The ultraviolet LED may be a GaN on sapphire or GaN on SiC device, preferably with a suitable buffer layer. In one embodiment, ultraviolet LED's are incorporated into three different composite devices, each with a different phosphor for producing blue, green and red, respectively. In another embodiment, a phosphor is selected to produce white light and a desired color is produced by passing the white light through a narrow band pass filter. According to this white-light embodiment, filters of blue, green and red may be used to create discrete composite devices that produce blue, green and red light at each pixel. The use of white light with appropriate narrow band pass filters has the advantage of producing a colored light with an excellent wave length distribution that will not change appreciably over time, a desirable property for color balancing. On the other hand, the use of three different phosphors to directly produce blue, green and red without a filter has the advantage of higher efficiency because light is not filtered out. Both approaches have the advantage of excellent persistence which, as known in the art, is a desirable feature that is especially important in video applications.

It will be appreciated that energy sources other than ultraviolet LED's may be used to excite the phosphors of the composite devices discussed immediately above.

The provision of one or more high resolution, highly aligned digital cameras at each display site, for example the camera or cameras utilized in digital camera and traffic counter 120, or other specifically dedicated cameras, provides a means permitting diagnostics and calibration of the displays. As known in the art, certain digital cameras have a resolution of over 7,000,000 pixels—as compared to approximately 172,000 pixels on the above-described 23×33½ ft. display. Thus, by directing a digital camera at a display, or directing multiple digital cameras at different discrete portions of a display, a correspondence may be attained where a portion of each digital camera's image corresponds to a single pixel in the display. At selected times set aside for diagnostics and calibration, such as a five minute period each night, the entire display may be run red, then green, then blue, followed by white, all at multiple power levels. In the most basic diagnostic operation carried out when the display is run red/green/blue, the camera(s), mounted at a selected distance from the display such as sixty feet away, are capable of detecting nonfunctioning or excessively degraded LED's for replacement.

Beyond replacing defective LED's, each night the system may automatically re-calibrate all LED's in the display. To this end, the display is run red/green/blue at several iterative power levels (e.g., 20%/40%/60%/80%/100%) and the optical power output of each LED is sensed for each power level, with the goal being to calibrate the system so that each red, green or blue LED has the same optical power output at each power level as do the other LED's of the same color. Calibration is achieved by diode recalibration scaler software that may be associated with the video converter/scaler at 110 (FIG. 1). The diode recalibration scaler receives information from the diagnostic equipment indicating the optical power output of each LED at the various power levels and, through an associated automatic calibration LED look-up table, accounts for daily variance in LED output (degradation or increase) by adjusting the power curve by which the LED will be driven the next day.

As an alternative to using digital cameras for the diagnostic function, in other embodiments miniature photodector chips, with or without filters, may be located in close proximity to each LED in the display for measuring LED light output during diagnostic/calibration operations.

When the diagnostic operation operates with an all white display, the three LED's at each pixel may be evaluated individually and collectively to assure that the pixel is contributing the proper spectrum and amount of white light. Through a diagnostic/calibration software package that interrelates output and peak wave length response for each red/green/blue LED at a pixel to the desired white light response, an iterative calibration may be undertaken at each pixel to correctly bias the drivers and thereby assure correct output.

It will be appreciated that split screen images may be displayed at the displays 30. In the simplest application, a still image advertisement may be one half corporate logo and one half scenery. Beyond this simple application, split screen capability may be used to present a portion of the image as a corporate logo, or the like, and the remainder either real time (or near real time) video or still frame. For example, a previously qualified customer with acceptable internal content review procedures may have direct access to a display or displays for the purpose of displaying a real time (or near real time) sports event, news event, or the like, in conjunction with the customer's corporate logo. This display may be achieved by utilizing high speed servers 100 or by bypassing the servers altogether. High speed still image or video transfer may be facilitated by compression techniques such as JPEG and MPEG II, known in the art.

While advertising scheduling and purchasing may take place as described above where customers directly purchase time from available slots according to a fixed fee schedule, it will be appreciated that alternative modes may be used. For example, an auction system such as introduced by eBay Corporation may be used where all available slots are auctioned (a "total" auction). Additionally, a limited auction may be utilized where time may be purchased and booked for a set price, but all time not purchased at the set price becomes available through auction at a fixed time before the run time, for example, one month before run time. As another alternative for a portion of the available time slots, a high usage customer may establish a monthly advertising budget with the system operator that authorizes the operator to select the time slots for display of the customer's advertisements at "best available rate" pricing, taking advantage of last minute availability of time slots and other time slot placement techniques that enable the operator to more completely utilize the network. This or similar time slot placement practices when used for a portion of the available time slots may be implemented by a software package that takes into account the needs of both the customer and the system operator.

It will be appreciated that advertising content information may be transmitted to the electronic display locations by physically delivering an information storage device such as CD ROM, zip drive or DVD RAM to the location in those cases where the location may be remote, or for other reasons.

While the present invention has been described with reference to specific embodiments, it will be appreciated that modifications may be made without departing from the true spirit and scope of the invention.

I claim:

1. A system permitting commercial advertisers to directly place video or still image advertisements at selected times and locations on a network of multiple electronic displays, said system comprising:
    a network including a plurality of electronic displays located in high traffic areas such as areas of high vehicular traffic, indoor and outdoor areas with high pedestrian traffic, movie theaters, restaurants, sports arenas and casinos;
    at least one central information processing station including:
        means permitting commercial advertising customers of the system to review a schedule of times and electronic display locations that are available for placement of advertisements and permitting customers to purchase available times at desired electronic display locations for placement of their advertising content;
        means for receiving customer transmitted video or still image advertising content;
        means for transmitting the advertising content received from the customer to the customer-selected electronic display location; and
        means for driving each selected electronic display to display the customer's advertising content at the customer-selected time.

2. The system of claim 1 wherein at least a substantial number of electronic displays are LED displays.

3. The system of claim 2 wherein each electronic display has its own dedicated server that receives advertising content information from the central information processing station and drives its respective electronic display to display the customer's advertising content at the customer-selected time.

4. The system of claim 1 wherein the mode of transmission for said means for transmitting the advertising content to the customer-selected electronic display is selected from the group consisting of high speed cable, satellite, dedicated phone, high speed line (e.g., ISDN), cellular, Internet, radio/radio pulse transmission and high speed optical fiber.

5. The system of claim 1 wherein said central information processing system includes a customer interface web server permitting public Internet access to the system.

6. The system of claim 1 including means for permitting review of customer advertising content before the content is transmitted to the customer-selected electronic display.

7. The system of claim 1 including means for generating a bill for the advertising time.

8. The system of claim 1 including means for generating a report to be sent to the customer confirming that an advertisement has run as ordered.

9. The system of claim 8 wherein said means for generating a report serves to generate demographic or market analysis.

10. The system of claim 1 wherein at least a substantial number of said electronic displays have associated cameras.

11. A system providing video or still image advertisements at selected times and locations on a network of multiple electronic displays, said system comprising:
    a network including a plurality of electronic displays located in high traffic areas such as areas of high vehicular traffic, indoor and outdoor areas with high pedestrian traffic, movie theaters, restaurants, sports arenas and casinos;
    at least one central information processing station including:
        means permitting advertising customers of the system to purchase time slots at selected electronic display locations for display of their advertising content;
        means for transmitting customer advertising content to the selected electronic display locations; and
        means for driving the electronic display at each selected location to display the customer's advertising content at the selected time.

12. A method of providing video or still image advertisements at selected times and locations on a network of multiple electronic displays that are located in high traffic areas such as areas of high vehicular traffic, indoor and outdoor areas with high pedestrian traffic, movie theaters, restaurants, sports arenas and casinos;
    permitting advertising customers of the system to purchase time slots at selected electronic display locations for display of their advertising content;
    transmitting customer advertising content to the selected electronic display locations; and
    driving the electronic display at each selected location to display the customer's advertising content at the selected time.

13. A system for presenting video or still-image content at selected times and locations on a networked connection of multiple electronic displays, said system comprising:
    a network interconnecting a plurality of electronic displays provided at various geographic locations;
    means for scheduling the presentation of video or still-image content at selected time slots on selected electronic displays of said network and receiving said video or still-image content from a content provider;
    transmission means in communication with said receiving means for communicating scheduled content to respective server devices associated with corresponding selected electronic displays of said network, each said associated device initiating display of said video or still-image content at selected times on a corresponding selected electronic display of said network.

14. The system as claimed in claim 13, wherein said geographic locations include public areas including one or more selected from the group comprising: areas of vehicular traffic, indoor and outdoor areas with pedestrian traffic, movie theaters, restaurants, sports arenas and casinos.

15. The system of claim 13, wherein said content includes one or more of public service announcements, news, or sporting events.

16. The system of claim 13, wherein said means enabling a content provider to schedule presentation of video or still-image content at selected time slots on selected electronic displays of said network includes a central processing server for receiving said video or still-image content from said content provider and initiating said communication of said video or still-image content to a selected electronic display for displaying said content at the selected times.

17. The system of claim 16, wherein said central processing server comprises means for enabling said content provider to view time slots for each electronic display location that are available for placement of said video or still-image content, and additionally enabling said content provider to purchase one or more available time slots at selected electronic display locations for presenting said content.

18. The system of claim 16, further comprising means in connection with said central processing server for enabling a review of received video or still image content prior to transmission to said associated server device of said selected electronic display, said content being transmitted to said selected electronic display upon reviewer approval of said content.

19. The system of claim 17, further comprising an interface server device for providing Internet access to said central processing server and enabling remote viewing, scheduling and purchasing from remote locations.

20. The system of claim 19, further including a security device for enabling said content provider to obtain and enter security code and billing code information to identify said content provider prior to accessing said system.

21. The system of claim 16, further including dedicated high-speed connection to said security device for enabling high-usage content providers to access the system.

22. The system of claim 19, wherein said video or still-image content is transmitted to said central processing server according to a mechanism selected from the group comprising: on-line through the Internet, a direct phone line, and, a high speed information transfer line.

23. The system of claim 16, wherein said still image or video content is formatted according to one format selected from the group comprising: NTSC, PAL, SECAM, YUV, YC, and VGA.

24. The system of claim 18, wherein each server device associated with a corresponding electronic display receives said content from said receiving means and provides functionality for driving said electronic displays, said content being transmitted to a server device associated with a selected display upon approval of said content to be displayed.

25. The system of claim 24, wherein said transmission means is selected from the group comprising: high speed cable, a satellite link, a dedicated phone connection, a high-speed communications line, a cellular or PCS data transmission device, the Internet, a radio or radio pulse transmission device, a high speed optical fiber, and physical delivery of a medium storing said content.

26. The system of claim 25, wherein said medium storing said content includes one of CD ROM, zip drive or DVD RAM.

27. The system of claim 25, further including a video converter/scaler mechanism associated with a server device for each display, said video converter/scaler mechanism enabling any required reformatting of said content according to said transmission means implemented.

28. The system of claim 20, further including:
means linked to each electronic display at each location for verifying that scheduled content for display is presented at the intended time at the intended display and generating verification information pertaining thereto; and,
means for receiving and storing said verification information generated by each said verification means.

29. The system of claim 28, wherein said verifying means includes a digital camera for recording the content appearing at its respective display.

30. The system of claim 28, wherein a location of said electronic display includes a location having vehicular traffic, said system further including a traffic count recorder means linked to each electronic display for counting amount of traffic passing that electronic display during a particular time slot and generating traffic count information for receipt and storage by said storage means.

31. The system of claim 30, further including a means for receiving said stored verification and traffic count information, analyzing said information and generating demographic information for reports to be sent to content providers after their content is displayed.

32. The system of claim 31, wherein said video or still-image content includes an advertisement, said demographic information for reports comprising information including: a time of the advertisement, the content of the advertisement, the traffic count, and residence/median income information about those who may have viewed the advertisement.

33. The system of claim 28, further including means for generating bills capable of being transmitted by phone lines to a content provider.

34. The system of claim 13, wherein said electronic display is high resolution, full color images utilizing light emitting diodes (LED's), said LEDs including an ultraviolet LED utilized for exciting a phosphor coating that produces light of a desired color spectrum.

35. The system of claim 34, wherein said phosphor coating is selected to produce white light, said white light being passing through a band pass filter to produce said desired color spectrum.

36. The system of claim 35, further including means for performing diagnostics and calibration of said electronic displays.

37. The system of claim 36, wherein said diagnostics and calibration means includes one or more digital camera devices aimed at portions of said display, a portion of each digital camera's image corresponding to a single pixel in the display, wherein said digital camera's image is capable of detecting non-functioning or degraded LED's.

38. The system of claim 36, wherein said diagnostics and calibration means includes:
means for iteratively causing the display of a color at each color LED at various power levels; and,
means for sensing the optical power output of each color LED for each power level, said calibrating including determining that each color LED has the same optical power output at each power level as other LED's of the same color.

39. The system of claim 36, wherein said diagnostics and calibration means includes a diode recalibration scaler mechanism for receiving information from the diagnostic information indicating the optical power output of each LED at the various power levels, and, including an associated automatic calibration LED look-up table for adjusting a power curve by which the LED will be driven in accordance with detected variances in LED output.

40. The system of claim 36, wherein said diagnostics and calibration means includes utilizing one or more photodetector means located in close proximity to each LED in the display for measuring LED light output during diagnostic/calibration operations.

41. The system of claim 36, wherein each pixel of said electronic display includes three colored LED's, said diagnostics and calibration means operating with an all white display, the display LEDs at each pixel being evaluated individually and collectively to assure that the pixel is contributing the proper spectrum and amount of white light.

42. The system of claim 13, further including means for enabling split screen images to be displayed at the electronic display.

43. The system of claim 42, wherein said split screen capability is utilized to present a still image portion of the image in one display area, and one of real time video, near real time video, or still frame in a second display area.

44. The system of claim 22, wherein said high speed still image or video transfer is facilitated by JPEG and MPEG data compression techniques.

45. The system of claim 16, further including auction sub-system for enabling available time slots to be auctioned.

46. The system of claim 45, wherein said auction sub-system enables the purchase of time slots for a set price, and all time not purchased at the set price becomes available through said auction sub-system at a fixed time before the run time.

47. The system of claim 16, further including means for preselecting time slots for display of the content provider's content at a "best available rate" pricing for those high volume content providers having establish a monthly budget to purchase a portion of the available time slots.

48. A method for presenting video or still-image content at selected times and locations on a networked connection of multiple electronic displays, said method comprising:
   a) providing a network interconnecting a plurality of electronic displays at various geographic locations;
   b) enabling a content provider to schedule presentation of video or still-image content at selected time slots on selected electronic displays of said network and receiving said video or still-image content from a content provider;
   c) providing a plurality of server devices, each server device associated with a corresponding electronic display;
   d) communicating received video or still-image content to the associated server devices of corresponding selected electronic displays of said network; and,
   e) said server device initiating display of said video or still-image content at selected times on an associated electronic display of said network.

49. The method of claim 48, wherein prior to step d) of communicating scheduled video or still-image content, the steps of:
   enabling content providers to view a schedule of times and electronic display locations that are available for placement of said content; and,
   enabling content providers to purchase one or more available time slots at selected electronic display locations for placement of their content.

50. The method of claim 48, wherein prior to step d) of communicating scheduled video or still-image content, the steps of:
   providing an appropriateness review of transmitted video or still image content; and,
   transmitting said content to said selected electronic display upon approval of said content.

51. The method of claim 49, further comprising the step of providing said content provider with Internet access to said system for enabling viewing, scheduling and purchasing of available time slots and electronic display locations from remote locations.

52. The method of claim 51, wherein prior to enabling access to said schedule of times and available electronic display locations, the step of providing security code and billing code information for identifying said content provider and authorizing content provider access to said system.

53. The method of claim 49, further including providing dedicated high-speed connection to a security device for enabling high-usage content providers to access the schedule of times and available electronic display locations.

54. The method of claim 51, wherein said communicating step d) further includes the step of: enabling a content provider to transmit said content to a central processing server according to a mechanism selected from the group comprising: on-line through the Internet, a direct phone line, and, a high speed information transfer line.

55. The method of claim 54, further comprising the step of formatting said still image or video content according to a format selected from the group comprising: NTSC, PAL, SECAM, YUV, YC, and VGA.

56. The method of claim 50, wherein a server device comprises one or more high speed server devices associated with each electronic display for driving said electronic displays, said method including transmitting said content to a server device associated with a selected display upon approval of said content to be displayed.

57. The method of claim 56, wherein said step d) of communicating scheduled content to the associated server devices further includes the step of: implementing a transmission mechanism selected from the group comprising: high speed cable, a satellite link, a dedicated phone connection, a high-speed communications line, a cellular or PCS data transmission device, the Internet, a radio or radio pulse transmission device, a high speed optical fiber, and physical delivery of a medium storing said content.

58. The method of claim 52, further including the steps of:
   verifying that scheduled content for display is presented at the intended time at the intended display and generating verification information pertaining thereto; and,
   receiving and storing in a storage device said verification information generated by each said verification means.

59. The method of claim 58, wherein said verifying step includes implementing a digital camera for recording the content appearing at its respective display.

60. The method of claim 58, wherein a location of said electronic display includes a location having vehicular traffic, said method further including the steps of: linking a traffic count recorder means to each electronic display for counting amount of traffic passing an electronic display during a particular time slot; and
   generating traffic count information for receipt and storage by said storage device.

61. The method of claim 60, further including the steps of:
   receiving said stored verification and traffic count information; analyzing said information; and,
   generating demographic information for reports to be sent to content providers agents after their content is displayed.

62. The method of claim 61, wherein said demographic information for reports comprises information including: a time of the advertisement, the content of the advertisement, the traffic count, and residence/median income information about those who may have viewed the content.

63. The method of claim 58, further including the steps of: generating bills associated with purchased time slots; and, transmitting said bills via phone lines to a content provider.

64. The method of claim 49, further including the step of performing diagnostics and calibration of said electronic displays.

65. The method of claim 64, wherein said diagnostics and calibration steps includes:
   utilizing one or more digital camera devices aimed at portions of said display, a portion of each digital camera's image corresponding to a single pixel in the display; and,
   detecting non-functioning or degraded LED's from said digital camera's image.

66. The method of claim 64, wherein said diagnostics and calibration step includes:
   iteratively causing the display of a color at each color LED at various power levels; and,
   sensing the optical power output of each color LED for each power level, said calibrating including determining that each color LED has the same optical power output at each power level as other LED's of the same color.

67. The method of claim 64, wherein said diagnostics and calibration step includes:
   implementing a diode recalibration scaler device for receiving information from the diagnostic information indicating the optical power output of each LED at the various power levels; and,
   implementing an associated automatic calibration LED look-up table for adjusting a power curve by which the LED will be driven in accordance with detected variances in LED output.

68. The method of claim 64, wherein said diagnostics and calibration step includes the step of utilizing one or more photodetector means located in close proximity to each LED in the display for measuring LED light output during diagnostic/calibration operations.

69. The method of claim 64, wherein each pixel of said electronic display includes three colored LED's, wherein said diagnostics and calibration step includes:
   generating an all white display;
   evaluating the display LEDs at each pixel individually and collectively to assure that the pixel is contributing the proper spectrum and amount of white light.

70. The method of claim 49, further including the step of: generating split screen images for display at the electronic display.

71. The method of claim 70, wherein said split screen capability is utilized for:
   presenting a still image portion of the image in one display area, and presenting one of real time video, near real time video, or still frame in a second display area.

72. The method of claim 54, further including the step of auctioning auctioning available time slots.

73. The system of claim 72, wherein said auctioning step includes:
   enabling the purchase of time slots for a set price, and enabling all time slots not purchased at the set price to become available through said auction sub-system at a fixed time before a scheduled display time.

74. The method of claim 72, further including the step of: preselecting time slots for display of the agent's content at a "best available rate" pricing for those high volume content providers having establish a monthly budget to purchase a portion of the available time slots.

* * * * *

UNITED STATES PATENT AND TRADEMARK OFFICE
CERTIFICATE OF CORRECTION

PATENT NO. : 6,430,603 B2
DATED : August 6, 2002
INVENTOR(S) : Charles Eric Hunter It is certified that error appears in the above-identified patent and that said Letters Patent is hereby corrected as shown below:

Column 10,
Line 40, "being passing" should read -- being passed --.

Column 14,
Line 24, delete "auctioning" (second occurrence).

Signed and Sealed this

Fourth Day of January, 2003

JAMES E. ROGAN
*Director of the United States Patent and Trademark Office*